US012588115B2

(12) United States Patent
Basso et al.

(10) Patent No.: US 12,588,115 B2
(45) Date of Patent: Mar. 24, 2026

(54) THERMORESISTIVE HEATING PLATE FOR MICROWAVE APPLIANCE

(71) Applicant: WHIRLPOOL CORPORATION, Benton Harbor, MI (US)

(72) Inventors: Margherita Basso, Scorzè (IT); Ping Wu, Shenzen (CN)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 778 days.

(21) Appl. No.: 17/939,734

(22) Filed: Sep. 7, 2022

(65) Prior Publication Data

US 2023/0180357 A1 Jun. 8, 2023

(30) Foreign Application Priority Data

Dec. 8, 2021 (CN) ........................ 202111489849.6

(51) Int. Cl.
*H05B 6/64* (2006.01)
*F24C 7/06* (2006.01)

(52) U.S. Cl.
CPC ............. *H05B 6/647* (2013.01); *F24C 7/067* (2013.01); *H05B 6/6402* (2013.01)

(58) Field of Classification Search
CPC ........ F24C 7/067; H05B 6/647; H05B 6/6402
See application file for complete search history.

(56) References Cited

U.S. PATENT DOCUMENTS 3,737,624 A * 6/1973 Eilenberger ............. H05B 3/74 219/466.1
4,326,113 A * 4/1982 Toyoda ................ H05B 6/6411 219/754
(Continued)

FOREIGN PATENT DOCUMENTS

CH 704191 A2 * 5/2012 .............. F24C 7/085
CN 1044394 A * 8/1990 ............ A47J 36/027
(Continued)

OTHER PUBLICATIONS

CN 110811301 Translation (Year: 2020).*
(Continued)

*Primary Examiner* — Woody A Lee, Jr.
(74) *Attorney, Agent, or Firm* — Brooks Kushman P.C.

(57) ABSTRACT

A heating appliance includes a housing having interior walls with interior surfaces defining a cooking chamber for heating food, a microwave heating source configured to generate microwave radiation for heating the food, and a thermoresistive heating plate disposed in an opening defined in an interior wall. The thermoresistive heating plate has a substrate having an inner surface aligned with the interior surface of the interior wall, and a bottom surface opposite to the inner surface. The thermoresistive heating plate includes a thermoresistive coating disposed on the bottom surface configured to generate heat upon application of an electric current such that the heat is transmitted through the substrate to the cooking chamber from the thermoresistive coating, the microwave heating source, or both, and the substrate is transparent to microwave radiation to allow microwave emission through the substrate.

20 Claims, 3 Drawing Sheets

(56) References Cited

U.S. PATENT DOCUMENTS

| | | | | | |
|---|---|---|---|---|---|
| 5,155,318 | A | * | 10/1992 | Bowen | H05B 6/76<br>219/757 |
| 9,900,935 | B2 | * | 2/2018 | Simonato | A47J 37/0611 |
| 10,251,223 | B2 | | 4/2019 | Linton | |
| 10,716,433 | B2 | | 7/2020 | Kim et al. | |
| 12,363,806 | B2 | * | 7/2025 | Hu | H05B 6/6402 |
| 2005/0019456 | A1 | * | 1/2005 | Iwasaki | A23B 2/92<br>426/242 |
| 2009/0194525 | A1 | | 8/2009 | Lee et al. | |
| 2019/0186754 | A1 | | 6/2019 | O'Ryan | |
| 2020/0163172 | A1 | | 5/2020 | Khizar et al. | |

FOREIGN PATENT DOCUMENTS

| | | | | | |
|---|---|---|---|---|---|
| CN | 1270129 | C | * | 8/2006 | H05B 6/6482 |
| CN | 207950733 | U | | 10/2018 | |
| CN | 110811301 | A | * | 2/2020 | A47J 36/24 |
| CN | 112545302 | A | * | 3/2021 | F24C 36/027 |
| CN | 113803750 | A | * | 12/2021 | F24C 7/043 |
| EP | 2638776 | A1 | | 9/2013 | |
| EP | 3 927 116 | A1 | | 12/2021 | |
| ES | 2366367 | T3 | * | 10/2011 | A21B 3/155 |
| KR | 1999 0015213 | U | | 5/1999 | |
| KR | 20080037796 | A | * | 5/2008 | H05B 6/6488 |
| KR | 20090121630 | A | * | 11/2009 | H05B 6/1209 |
| KR | 2010 0119913 | A | | 11/2010 | |
| WO | WO-2004091260 | A1 | * | 10/2004 | H05B 6/806 |

OTHER PUBLICATIONS

European Search Report for EP Application No. 22210948.0, dated Apr. 24, 2023, 7 pages,.

China Office Action Search Report dated Oct. 21, 2025 for China Application No. 2021114898496; 7 pages.

* cited by examiner

THERMORESISTIVE HEATING PLATE FOR MICROWAVE APPLIANCE

CROSS-REFERENCE TO RELATED APPLICATIONS

This application claims foreign priority benefits under 35 U.S.C. § 119(a)-(d) to Chinese patent application 2021114898496, filed Dec. 8, 2021, the disclosure of which is hereby incorporated in its entirety by reference herein.

TECHNICAL FIELD

The present application is directed to a cooking appliance, and more particularly a thermoresistive heating coating in heating appliances which use microwave heating.

BACKGROUND

Ovens are heating appliances for food preparation having a housing defining a cavity forming a cooking chamber therein. Ovens include a heating mechanism for cooking food placed within the cooking chamber, with the heating mechanism being variable across different types of ovens, and two or more types of heating mechanisms may be combined in combination ovens. Common types of ovens include electric ovens (which include conduction/conventional and convection ovens), gas ovens, toaster ovens, and microwave ovens. The heating mechanisms vary across these ovens, with some including the heating mechanisms within the cooking chamber itself (e.g., conventional ovens), or in the housing (e.g., convection ovens) such that energy or heat is transferred to the cooking chamber or the food. The heating mechanism in electric ovens includes electric coils (with circulation via fans in convection ovens) to heat the cooking chamber, in gas ovens includes burning natural gas to heat the cooking chamber, and in microwave ovens includes electromagnetic radiation via strong radio waves from devices such as magnetrons to heat the food itself. Heating appliances known as combination ovens may include one or more of the above mentioned heating mechanisms.

SUMMARY

According to one or more embodiments, a heating appliance includes a housing having interior walls with interior surfaces defining a cooking chamber for heating food, a microwave heating source configured to generate microwave radiation for heating the food, and a thermoresistive heating plate disposed in an opening defined in an interior wall. The thermoresistive heating plate has a substrate having an inner surface aligned with the interior surface of the interior wall, and a bottom surface opposite to the inner surface. The thermoresistive heating plate includes a thermoresistive coating disposed on the bottom surface configured to generate heat upon application of an electric current such that the heat is transmitted through the substrate to the cooking chamber from the thermoresistive coating, the microwave heating source, or both, and the substrate is transparent to microwave radiation to allow microwave emission through the substrate.

According to at least one embodiment, the thermoresistive heating plate may have a microwave efficiency of 20 to 80%. In at least one embodiment, the thermoresistive heating plate may further include an insulation layer, with the thermoresistive coating positioned between the insulation layer and the substrate. In a further embodiment, the insulation layer may be a ceramic material. In one or more embodiments, the thermoresistive heating plate may include electrical contacts on the bottom surface to connect the thermoresistive coating to a power supply. In certain further embodiments, the electrical contacts may be made of silver. In at least one embodiment, the thermoresistive coating may include a coating matrix with an active filler dispersed therein. According to at least one embodiment, the interior wall may be a bottom wall or a ceiling defining the cooking chamber. In at least one embodiment, the interior wall may be a side wall defining the cooking chamber. In certain further embodiments, the interior walls may include opposing side walls, and the heating appliance may include a respective thermoresistive heating plate in each of the opposing side walls defining the cooking chamber. In at least one embodiment, the thermoresistive coating may have a thickness of 0.2 nm to 300 microns. In one or more embodiments, the substrate may be a glass-ceramic substrate having a microwave transmittance of 30 to 75%.

According to one or more embodiments, a thermoresistive heating plate for a combination microwave oven, the thermoresistive heating plate includes a substrate having a first surface configured to form a portion of an interior of a cooking chamber, and a second surface opposite to the first surface; and a thermoresistive coating disposed on at least a portion of the second surface. The thermoresistive coating includes a coating matrix with an active filler dispersed therein and is configured to generate heat upon application of an electric current. The heat is conductible through the substrate from the thermoresistive coating into the cooking chamber, and the substrate is transparent to microwave radiation to allow microwave emission through the substrate into the cooking chamber.

According to at least one embodiment, the active filler may include single-walled or multi-walled carbon nanotubes. In certain embodiments, the coating matrix may be a ceramic phosphate material. Moreover, in some embodiments, the active filler may be 0.001 to 30% by weight of the thermoresistive coating.

According to one or more embodiments, a method of forming a heating appliance includes providing a housing having interior walls with interior surfaces defining a cooking chamber for heating food, applying a thermoresistive coating to a surface of a substrate to form a thermoresistive heating plate, and positioning the thermoresistive heating plate in an opening defined in an interior wall such that microwave radiation can pass through the substrate into the cooking chamber. An inner surface of the substrate, opposite to the bottom surface, is flush with the interior surface of the interior wall to define the cooking chamber.

According to at least one embodiment, the method may further include applying metal connecting lines to the surface before applying the thermoresistive coating to form electrical contacts for the thermoresistive heating plate. In at least one embodiment, applying the thermoresistive coating includes depositing the thermoresistive coating on the substrate, and curing the thermoresistive coating. In some further embodiments, the thermoresistive coating may include single walled or multi-walled carbon nanotubes dispersed in a coating matrix.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

According to one or more embodiments, a heating appliance for cooking food, such as a microwave oven or a combination oven having at least a microwave heat source, includes a cooking chamber defined by cavity walls in a housing. At least one of the cavity walls defines a respective opening, with a thermoresistive heating plate disposed therein. The thermoresistive heating plate includes a thermoresistive coating disposed on a substrate, with the substrate being microwave transmissive to emit microwave radiation from the microwave heat source into the cooking chamber. The substrate is also heat conductive to allow for the thermoresistive coating to generate heat for heating the cooking chamber. The thermoresistive heating plate may be positioned within one or more of the cavity walls, and may include an insulation layer sandwiching the thermoresistive coating between the insulation layer and the substrate to protect the housing.

Figure 1:
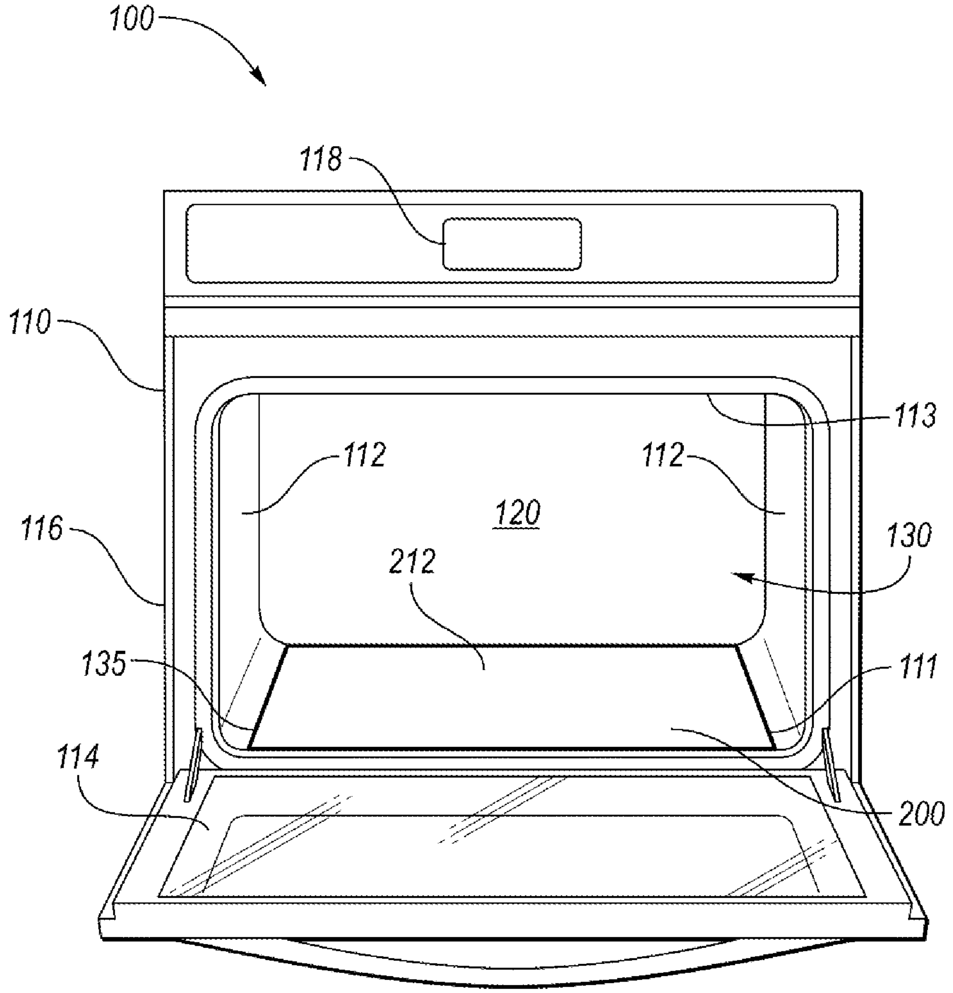
FIG. 1 is a schematic front view of a heating appliance, according to an embodiment.

Referring to FIG. 1, a perspective view of a heating appliance 100 is shown, according to an embodiment. The heating appliance 100 is shown and described with reference to only the relevant general components, which is not intended to be limiting, as the heating appliance 100 includes other components and features for operation that are not shown or described herein but are expected as being included in the heating appliance 100. The heating appliance 100 includes a housing 110 with interior side walls 112, a base 111, and a ceiling 113 which cooperate to define a cooking chamber 120. The housing 110 also has an outer surface 116 exposed to the external environment. The heating appliance 100 includes a door 114 having an open position for providing access to the cooking chamber 120, and a closed position sealing the cooking chamber 120 from the external environment. The cooking chamber 120 is sized based on suitable sizes for kitchen appliances and for receiving food items to be cooked, and may include components for optimizing space and cooking of the food items, such as a turntable (not shown) or shelving racks (not shown). The heating appliance 100 may draw power from an external power source (not shown) such as an electrical plug and outlet connection. The heating appliance 100 may be connected to the power supply via any suitable power cable, and may include any other components such as, but not limited to, power inverters, transformers, voltage converters, etc., to supply the requisite power to features of the heating appliance 100. The input may be any suitable input based on the appliance 100. For example, the voltage input may be 120 V and the maximum power may be 1600 W.

The heating appliance 100 includes at least one heating mechanism (not shown) for cooking food placed within the cooking chamber 120. The heating mechanism is activated by user input at a control panel 118 located on the outer surface 116 (as shown in FIG. 1) or the door 114 (not shown). The heating mechanism may be included within the housing 110 or within the cooking chamber 120, as dependent on the particular type of heating appliance 100. The heating mechanism may be via microwave radiation from any suitable microwave generating mechanism, such as, but not limited to, or one or more magnetrons or solid-state devices. Although the heating appliance 100 may be referred to as microwave oven 100, and a microwave oven is depicted in FIG. 1, this is not intended to be limiting and other types of heating appliances such as combination ovens that include a microwave generating mechanism for microwave heating along with another heating mechanism (e.g., electric coils and/or gas) are also contemplated as the heating appliance 100. As such, the heating appliance 100 may be any suitable domestic appliance for cooking food, such as, but not limited to, ovens, microwave ovens, toaster ovens, and the like, such that the features described herein for the heating appliance 100 are suitable for oven or microwave oven applications where microwaves are present within the cooking chamber 120. In the embodiment shown in FIG. 1, the heating appliance 100 is a microwave such that the heating mechanism may be a microwave generating device disposed in the housing 110 in any suitable manner, e.g., between the side walls 112, the ceiling 113, or the base 111 and the outer surface 116. The microwave radiation is generated by the microwave generating device and transmitted via any suitable mechanism, such as a waveguide, a coaxial cable or a strip line which supplies the microwave radiation to one or multiple feeding ports (as dependent on the design) which are open to the cooking chamber 120 to heat food placed therein.

Figure 3B:
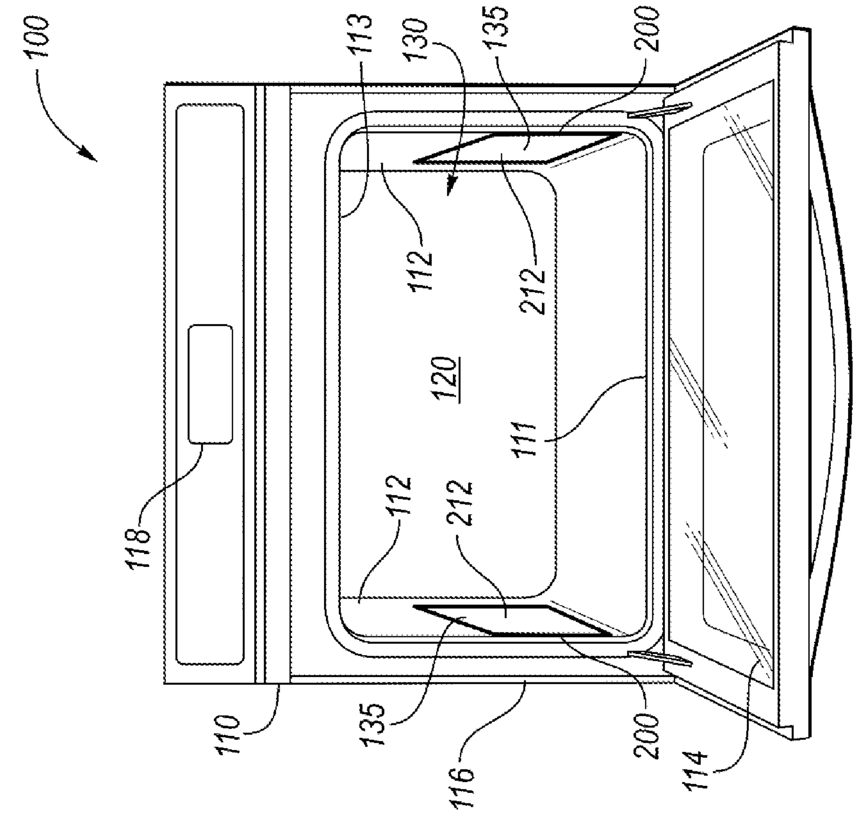
FIGS. 3A-B are schematic front views of a heating appliance, according other embodiments.
Figure 3A:
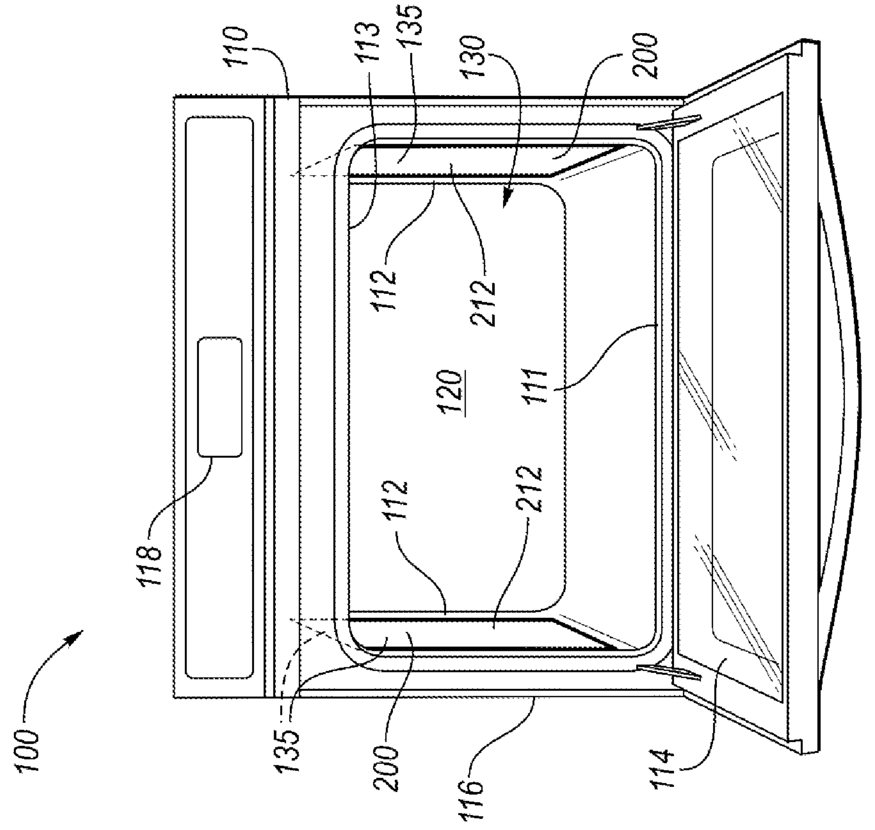
Figure 4:
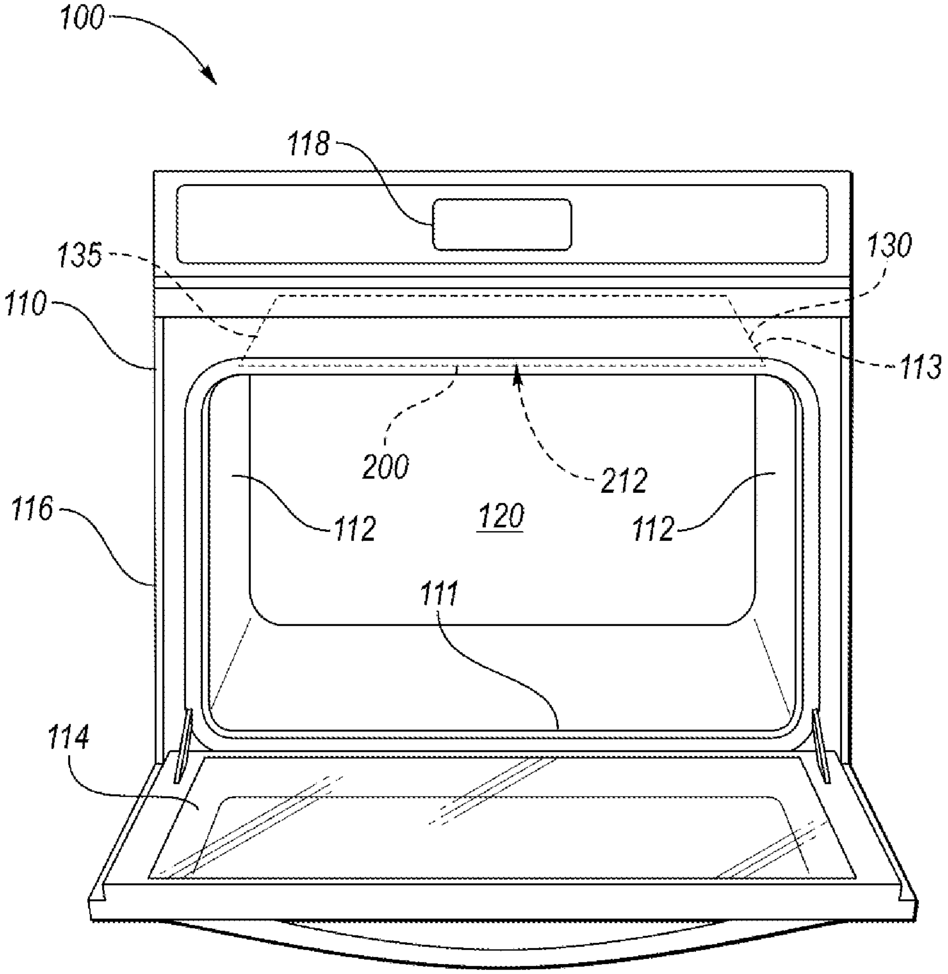
FIG. 4 is schematic front view of a heating appliance, according to another embodiment.

According to various embodiments, the heating appliance 100 includes one or more thermoresistive heating plates 200 incorporated into at least a portion of one or more corresponding surfaces forming the cooking chamber 120, such as the base 111 (as shown schematically in FIG. 1), the interior side walls 112 (as shown in FIGS. 3A-B), and the ceiling 113 (as shown in FIG. 4), or combinations thereof, hereinafter collectively referred to as cavity wall(s) 130. Moreover, the heating plate 200 may be incorporated as at least a portion of one or more of the cavity walls 130 (e.g., at least a portion of one or more of interior side walls 112, ceiling 113, or the base 111). In certain embodiments, the cavity walls 130 may be metal walls. The various embodiments will be referred to collectively with like reference numerals hereinafter.

The thermoresistive heating plate 200 is incorporated into a corresponding opening 135 defined in the corresponding cavity wall 130 of the cooking chamber 120 (e.g., the base 111 in FIG. 1, portions of the side walls 112 in FIGS. 3A-B, and the ceiling 113 in FIG. 4). The thermoresistive heating plate 200 is positioned within the opening 135 of the cavity wall 130 such that the thermoresistive plate 200 is flush with cavity wall 130. In certain embodiments, the thermoresistive plate 200 may be removable from the opening 135 such that the thermoresistive plate 200 can be easily replaced and/or serviced. The thermoresistive heating plate 200 provides an efficient heating function for convective heating for the cooking chamber 120 while also providing a microwave transmissive wall for microwave heating.

Figure 2:
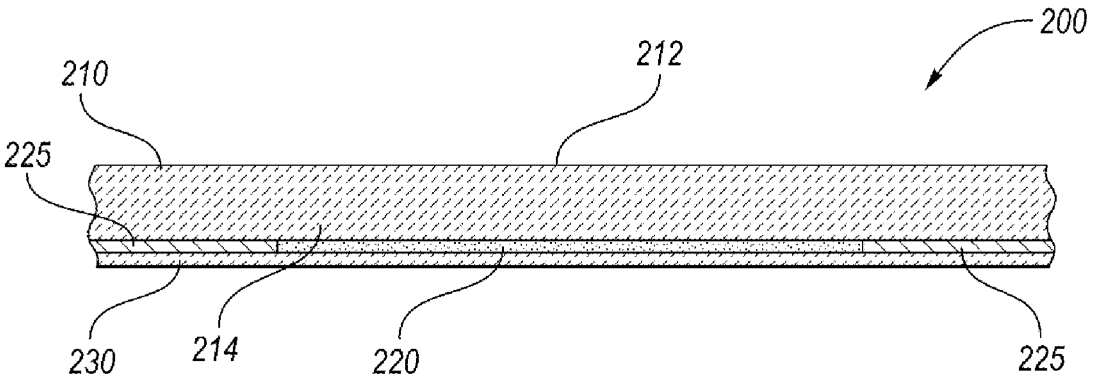
FIG. 2 is a schematic view of a thermoresistive heating plate for a heating appliance, according to an embodiment.

Referring to FIG. 2, the thermoresistive heating plate 200 includes a substrate 210 having an inner surface 212 facing the cooking chamber 120, and a bottom surface 214 on a bottom side of the substrate 210, opposite from the inner surface 212. The thermoresistive heating plate 200 further includes a thermoresistive coating 220 disposed on the bottom surface 214 of the substrate 210, and an insulation layer 230 disposed on the thermoresistive coating 220, sandwiching the thermoresistive coating 220 between the insulation layer 230 and the substrate 210. The substrate 210 may be any suitable material resistant to thermal shock and having a melting point higher than the working temperatures reached by the thermoresistive coating 220. For example, the substrate 210 may be a glass, ceramic, glass-ceramic, or metal material. For example, the substrate 210 may be any suitable material, including, but not limited to glasses (e.g., sodalime, borosilicate, silica, etc.), glass ceramics (e.g., lithium aluminum silicates, etc.). The substrate 210 may be a glass or glass-ceramic material which is colored, tinted, or transparent as based on aesthetic considerations. The substrate material is selected to withstand temperatures up to 700° C. without expansion or detriment to structural integrity, and may have a thermal expansion coefficient of 0.5 to 0 up to 700° C. Furthermore, the substrate 210 may be a suitable material having a sufficient thermal conductivity for transferring heat through the substrate material and into the cooking chamber 120 as generated by the thermoresistive coating 220 (located on the outer side as compared to the cooking chamber 120). In certain embodiments, the thermal conductivity is at least 0.5 W/mK for heating the cooking chamber 120. In other embodiments, the substrate material has a thermal conductivity of 1 to 2 W/mK. The substrate 210 may have any suitable thickness for transferring heat to the cooking chamber 120 and form at least a portion of a cavity wall 130, and in some embodiments, may have a thickness of 1 to 8 mm, in other embodiments 2 to 7 mm, and in yet other embodiments 2.5 to 6.5 mm. In certain examples, the substrate 210 may be 3 to 4 mm thick. The substrate 210 is at least partially transparent to microwave wavelengths through a thickness of the substrate 210 such that the microwave generating device can pass microwave radiation through the glass substrate 210 and to the cooking chamber 120, thus allowing the thermoresistive heating plate 200 as entry point for microwave emission into the cooking chamber 120. As such, the substrate 210 may have a microwave transmittance of 30 to 75% in some embodiments, 40 to 70% in other embodiments, and 45 to 60% in yet further embodiments.

Referring again to FIG. 2, the thermoresistive coating 220 is coated on the bottom surface 214 of the substrate 210, and exhibits a thermo-resistive property upon application of current through the thermoresistive coating 220. For example, the thermoresistive coating 220 may include conductive filler particles (e.g., metal oxide particles, or graphite or carbon nanomaterials such as nanotubes, spheres, or flakes) dispersed in a ceramic matrix (e.g., alumina, silica, phosphate, etc., with the conductive filler particles being the active material for heating. The thermoresistive coating 220 may also include, in certain embodiments, other fillers such as thickeners or dispersants for aiding in deposition or film formation, such as, for example, silica. The thermoresistive coating 220 is sandwiched between the substrate 210 and an insulation layer 230. The thermoresistive coating 220 may be electrically connected in any suitable manner (shown as electrical connection 225 in FIG. 2), such as, but not limited to, by silver paste, copper connectors or other wiring, buses, or interconnects to flow current through the thermoresistive coating 220 to produce heat. In one or more embodiments, the electrical connections 225 are positioned on opposite sides of the thermoresistive heating plate 200 to allow current to flow through the heating plate 200 from one of the electrical connection points 225 to the other, such that heat is generated in the thermoresistive coating 220 and transferred to the cooking chamber 120 via the substrate 210. The electrical connection points 225 may be sandwiched between the substrate 210 and the insulation layer 230, and be positioned on either side of the thermoresistive coating 220 to allow current to flow therethrough.

In one or more embodiments, as previously noted, the thermoresistive coating 220 includes a coating matrix with an active filler dispersed therein to provide resistive heating to the cooking chamber 120 through the substrate 210. The active filler within the thermoresistive coating 220 behave as ohmic resistors which generate heat upon application of electricity to the thermoresistive heating plate 200, thus providing heat to be conducted through the glass-ceramic substrate 110 to the cookware articles thereon. The active filler may be, in certain embodiments, single walled or multi-walled carbon nanotubes, graphite particles, or metal oxide particles. The active filler, in certain embodiments, have a loading concentration of 0.001 to 30% by weight, in other embodiments 0.01 to 10% by weight, and in yet further embodiments, 0.10 to 5.0% by weight, as based on the wet loading in the coating for deposition. The active filler may have each an average size (as based on the largest dimension of the particle), in some embodiments, of 0.2 nm to 300 microns, in other embodiments, 5 nm to 250 microns, and in yet other embodiments, 25 nm to 200 microns. The thermoresistive coating 220 may include, in some embodiments, other fillers in the coating matrix, such as, but not limited to, volume fillers, corrosion inhibitors, and the like, including, but not limited to, silica particles. Furthermore, in one or more embodiments, the coating matrix of the thermoresistive coating 220, is a ceramic matrix with shielding action against oxidation at high temperatures (i.e., up to 500 degrees C.), such as, but not limited to, aluminum phosphate, silicon phosphate, magnesium phosphate, silicates, or combinations thereof. In embodiments where the ceramic matrix is aluminum phosphate, the pH of the liquid state of the coating matrix may be from 2 to 8.

The thermoresistive coating 220 may have any suitable resistance based on its composition for the desired heat generation as based on the heating requirements for the cooking chamber 120. In some embodiments, the thermoresistive coating 220 may have a resistance of 10 to 50Ω, in other embodiments, 1.0 to 35Ω, and in yet other embodiments, 20 to 30Ω. The thermoresistive coating 220, upon application of current, may in certain embodiments, reach a maximum temperature of around 400° C. to 600° C., in other embodiments, 450° C. to 550° C., and in yet other embodiments, 475° C. to 525° C. In one or more embodiments, the heating ramp for the thermoresistive coating may be 45 to 250° C. per minute, in other embodiment 50 to 200° C. per minute, and in yet other embodiments, 55 to 150° C. per minute. Furthermore, the heating ramp for the thermoresistive coating may be, in certain embodiments, 75 to 250° C. per minute, in other embodiment 85 to 200° C. per minute, and in yet other embodiments, 95 to 150° C. per minute. The thermoresistive coating 220 may be coated on the bottom surface 214 in any suitable pattern, on at least a portion of the bottom surface 214 (e.g., symmetrical or asymmetrical patterns, like stripes, checker-board pattern, segments, etc.). As such, the thermoresistive coating 220 can provide tailored heating as based on the cooking chamber 120. The thermoresistive coating 220 may be, in some embodiments, a thin film layer, such that the scale of the thermoresistive film layer upon curing has a thickness of up to 100 micrometers. In other embodiments, the thickness of the thermoresistive coating 220 may be thicker than those defined as thin film layers, and may have thicknesses up to the mm range. The thermoresistive coating 220 has a thickness of, in some embodiments, 15 nm to 1.75 mm, in other embodiments, 20 nm to 1.5 mm, and in yet other embodiments, 25 nm to 1 mm. In yet other embodiments, the thermoresistive coating 220 may have a thickness of 25 to 500 nm, in yet other embodiments 25 to 450 nm, and in yet other embodiments, 25 to 425 nm. In at least one embodiment, after deposition, the wet thermoresistive coating may have a thickness of 25 to 75 microns, and in other embodiments, 40 to 60 microns. In at least one embodiment, after curing, the dry thermoresistive coating 220 has a thickness of 10 to 50 microns, in other embodiments, 15 to 45 microns, and in yet other embodiments 20 to 40 microns. Although shown in FIG. 2 as a single layer of the thermoresistive coating 220, the thermoresistive coating 220 may include any number of layers to generate the desired heating, and depiction of a single layer is not intended to be limiting. For example, the thermoresistive coating 220 may include two or more layers forming the thickness of the thermoresistive coating. As such, each layer of the thermoresistive coating 220 may independently be a thin film having a thickness of up to 100 microns, or have a thickness up to 1.75 mm. Moreover, the collective layers of the thermoresistive coating 220 may have a thickness of up to 1.75 mm, with each layer having a varying thickness.

Furthermore, the thermoresistive coating 220 is reflective to microwave radiation, thus avoiding indirect and unwanted heat generation in the heating plate 200 when the heating appliance is operating only with microwave heating. In some embodiments, as based on the pattern of the coating, the microwave efficiency of waves passing through the coated substrate (i.e., the thermoresistive heating plate 200) may be from 20 to 80%, and in other embodiments 30 to 70%, and in yet further embodiments, 40 to 60%. The thermoresistive coating 220 has a low to no absorbance of microwave radiation, and is thus reflective. In one or more embodiments, the thermoresistive coating 220 alone may be 95 to 100% reflective to microwave radiation, in other embodiments 96 to 100% reflective, and in yet other embodiments 97 to 100% reflective. With regard to microwave radiation penetration, the thermoresistive coating 220 in some embodiments has an absorptivity to microwaves of 0 to 5%, in other embodiments, 0 to 2.5%, and in yet other embodiments, 0 to 1%. The absorptivity of the thermoresistive coating 220 is the measure of a materials' effectiveness in absorbing radiant energy. Generally, the substrate 210 is more transmissive for microwaves than the thermoresistive coating 220, thus allowing the microwave emission to be directed to the cooking chamber 120.

Referring again to FIG. 2, the insulation layer 230 is a coating matrix material that insulates the housing 110 of the appliance 100 from heat generated by the thermoresistive heating plate 200 as well as provides electrical insulation to the thermoresistive coating 220. The insulation layer 230 may be chosen based on the substrate type. In certain embodiments, the insulation layer 230 may be a material similar to the ceramic material of the coating matrix. In other embodiments, the material of the insulation layer 230 may be another ceramic (alumina, alumina-titania, corierite), or may be a high temperature resistant resin, such as a silicon-based high temperature resistant resin. Although shown as a single layer, the insulation layer 230 may include any suitable number of protective and/or insulative layers and/or a combination of layer materials to sandwich the thermoresistive coating 220 between the insulation layer 230 and the substrate 210. The insulation layer 230 facilitates heat transfer in the direction of the substrate 210. The insulation layer 230 may be any suitable thickness to protect the thermoresistive coating 220 on the bottom side (with respect to the substrate 210 being on the top side) and protect the housing 110 of the appliance from heat, and in some embodiments may be 0.1 to 0.5 mm thick, in other embodiments, may be 0.25 to 0.45 mm thick, and in yet other embodiments may be 0.3 to 0.4 mm thick. In certain embodiments, although not shown, the thermoresistive heating plate 200 may optionally include other coatings on the inner surface 212 of the substrate 210 towards the cooking chamber 120. For example, the substrate 210 includes an easy-to-clean coating 240 on the inner surface 212 having hydrophobic or oleophobic properties (e.g., a water or oil contact angle of at least 90 degrees) such that adhesion of foodstuffs or chemicals is reduced on the easy-to-clean coating 240.

Although in FIG. 1 the opening 135 is shown in the base 111 defining the cooking chamber 120, the thermoresistive heating plate 200 may be incorporated in other cavity walls 130, or in any combination of cavity walls 130. Moreover, the thermoresistive heating plate 200 may be incorporated in a portion of the respective cavity wall 130. For example, the thermoresistive heating plate 200 may form 30 to 100% of the cavity wall 130, in some embodiments, 50 to 95% of the cavity wall 130 in other embodiments, and 75 to 90% of the wall in yet other embodiments. Referring to FIGS. 3A-B, the thermoresistive heating plate 200 is included in the side walls 112 (FIG. 3A) and over a portion of the height of the side walls 112 (FIG. 3B). In yet other embodiments, as shown in FIG. 4, the thermoresistive heating plate 200 may be incorporated as at least a portion of the ceiling 113. Although not shown in the Figures, there may be a thermoresistive heating plate 200 on one or more of the cavity walls 130, and depiction of the thermoresistive heating plate 200 being incorporated in a particular location is not intended to be limiting.

As such, the thermoresistive heating plate 200 generates heat via a thin film thermoresistive heating which allows the heating plate 200 to reach high temperatures in short timespans, while avoiding microwave absorption to ensure efficient heating of the food within the cooking chamber 120.

According to one or more embodiments, a method of forming a heating appliance with a thermoresistive heating plate is provided. The method includes preparing a thermoresistive heating plate by depositing metal connecting lines on a substrate. The depositing may be by any suitable method, including, but not limited to, thermal spray or screen printing. The depositing may be based on a desired pattern formed. The metal connecting lines may be formed using a silver paste or a silver-copper paste. After depositing the metal connecting lines, the method includes curing the metal connecting lines at a temperature between 50 and 500 degrees C., in some embodiments, and between 100 and 350 degrees C. in other embodiments. The method further includes applying a thermoresistive coating to a bottom surface of the substrate, and curing the coating. The applying may be based on the pattern of the metal connecting lines, which connect the thermoresistive coating to a power supply. The thermoresistive coating may be applied by any suitable method, including, but not limited to, screen printing, stencil printing, or other deposition method. The coating may be cured, in at least one embodiment, at a temperature between 200 and 500 degrees C., and in other embodiments, at a temperature between 300 and 400 degrees C. The curing may be, in some embodiments, for 1 to 70 minutes, and in other embodiments, 20 to 35 minutes, in an oven or furnace. In certain embodiments, both the metal connecting lines and the thermoresistive coating may be applied prior to the curing step, such that the curing step may be a single step after the coating deposition. The cured thermoresistive heating plate is then deposited within an opening in a cavity wall of the heating appliance, with the top surface of the substrate (opposite from the bottom surface) is flush with the cavity wall. Thus, a heating appliance is provided that allows thermoresistive heating of the cooking chamber via the thermoresistive coating and heat conduction through the substrate, as well as microwave emission through the substrate into the cooking chamber via microwave transmissivity of the substrate material.

Thus, according to various embodiments, a heating appliance includes a thermoresistive heating plate embedded in an opening in at least one wall defining the cooking chamber to generate heat via a thin film thermoresistive heating which allows the heating plate to reach high temperatures in short timespans, while avoiding microwave absorption to ensure efficient heating of the food within the cooking chamber. The thermoresistive heating plate includes a substrate with a top surface facing the cooking chamber, the substrate being transmissive to microwave emission to allow microwaves to pass therethrough and thermally conductive to allow heat to transfer therethrough. The bottom surface of the glass-ceramic substrate is coated with a thermoresistive heating coating which is electrically connected to a power supply. Upon application of an electric current, the resistive property of thermoresistive coating generates heat to be conducted through the glass-ceramic substrate to the cooking chamber. Furthermore, the heating appliance may include an insulation layer on the surface of the thermoresistive coating opposite to the glass-ceramic substrate to improve the heating in the direction of the glass-ceramic substrate.

Except where otherwise expressly indicated, all numerical quantities in this disclosure are to be understood as modified by the word “about”. The term “substantially,” “generally,” or “about” may be used herein and may modify a value or relative characteristic disclosed or claimed. In such instances, “substantially,” “generally,” or “about” may signify that the value or relative characteristic it modifies is within ±0%, 0.1%, 0.5%, 1%, 2%, 3%, 4%, 5% or 10% of the value or relative characteristic (e.g., with respect to transparency as measured by opacity). Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

As referenced in the figures, the same reference numerals may be used herein to refer to the same parameters and components or their similar modifications and alternatives. For purposes of description herein, the terms “upper,” “lower,” “right,” “left,” “rear,” “front,” “vertical,” “horizontal,” and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A heating appliance, comprising:

a housing having interior walls with interior surfaces defining a cooking chamber for heating food;

a microwave heating source configured to generate microwave radiation for heating the food;

a thermoresistive heating plate disposed in an opening defined in at least one interior wall of the interior walls, the thermoresistive heating plate having a substrate having an inner surface aligned with the interior surface of the at least one interior wall, and a bottom surface opposite to the inner surface; and a thermoresistive coating disposed on the bottom surface configured to generate heat upon application of an electric current, the thermoresistive coating including active filler particles dispersed in a ceramic matrix, the active filler particles being configured to generate heat upon application of an electric current, wherein the heat is transmitted through the substrate to the cooking chamber from the thermoresistive coating, the microwave heating source, or both, and the substrate is transparent to microwave radiation to allow microwave emission through the substrate.

2. The heating appliance of claim 1, wherein the thermoresistive heating plate has a microwave efficiency of 20 to 80%.

3. The heating appliance of claim 1, wherein the thermoresistive heating plate further includes an insulation layer, with the thermoresistive coating positioned between the insulation layer and the substrate.

4. The heating appliance of claim 3, wherein the insulation layer is a ceramic material.

5. The heating appliance of claim 1, wherein the thermoresistive heating plate includes electrical contacts on the bottom surface to connect the thermoresistive coating to a power supply.

6. The heating appliance of claim 5, wherein the electrical contacts are made of silver.

7. The heating appliance of claim 1, wherein the thermoresistive coating includes a coating matrix with an active filler dispersed therein.

8. The heating appliance of claim 1, wherein the at least one interior wall is a bottom wall or a ceiling defining the cooking chamber.

9. The heating appliance of claim 1, wherein the at least one interior wall is a side wall defining the cooking chamber.

10. The heating appliance of claim 1, wherein the interior walls include opposing side walls, and the heating appliance includes a respective thermoresistive heating plate in each of the opposing side walls defining the cooking chamber.

11. The heating appliance of claim 1, wherein the thermoresistive coating has a thickness of 0.2 nm to 300 microns.

12. The heating appliance of claim 1, wherein the substrate is a glass-ceramic substrate having a microwave transmittance of 30 to 75%.

13. A thermoresistive heating plate for a combination microwave oven, the thermoresistive heating plate comprising:

a substrate having a first surface configured to form a portion of an interior of a cooking chamber, and a second surface opposite to the first surface; and a thermoresistive coating including a ceramic coating matrix with conductive filler particles dispersed therein, the thermoresistive coating disposed on at least a portion of the second surface and the conductive filler particles configured to generate heat upon application of an electric current, wherein the heat is conductible through the substrate from the thermoresistive coating into the cooking chamber, and the substrate is transparent to microwave radiation to allow microwave emission through the substrate into the cooking chamber.

14. The thermoresistive heating plate of claim 13, wherein the conductive filler particles include single-walled or multi-walled carbon nanotubes.

15. The thermoresistive heating plate of claim 13, wherein the coating matrix is a ceramic phosphate material.

16. The thermoresistive heating plate of claim 13, wherein the conductive filler particles are 0.001 to 30% by weight of the thermoresistive coating.

17. A method of forming a heating appliance comprising:

providing a housing having interior walls with interior surfaces defining a cooking chamber for heating food;

applying a thermoresistive coating to a surface of a substrate to form a thermoresistive heating plate, the thermoresistive coating including a ceramic coating matrix with conductive filler particles dispersed therein, the conductive filler particles configured to generate heat upon application of an electric current; and positioning the thermoresistive heating plate in an opening defined in an interior wall such that microwave radiation can pass through the substrate into the cooking chamber, wherein an inner surface of the substrate, opposite to the bottom surface, is flush with the interior surface of the interior wall to define the cooking chamber.

18. The method of claim 17, further comprising applying metal connecting lines to the surface before applying the thermoresistive coating to form electrical contacts for the thermoresistive heating plate.

19. The method of claim 17, wherein applying the thermoresistive coating includes depositing the thermoresistive coating on the substrate, and curing the thermoresistive coating.

20. The method of claim 19, wherein the conductive filler particles include single walled or multi-walled carbon nanotubes.

* * * * *